United States Patent
Wrosch et al.

(10) Patent No.: US 8,002,873 B2
(45) Date of Patent: Aug. 23, 2011

(54) MOBILE NITROGEN GENERATION SYSTEM

(76) Inventors: Michael J. Wrosch, Attica, MI (US);
Anthony F. Grzelakowski, Imlay City, MI (US)

( * ) Notice: Subject to any disclaimer, the term of this patent is extended or adjusted under 35 U.S.C. 154(b) by 844 days.

(21) Appl. No.: 11/602,941

(22) Filed: Nov. 21, 2006

(65) Prior Publication Data

US 2007/0125232 A1    Jun. 7, 2007

Related U.S. Application Data

(60) Provisional application No. 60/738,933, filed on Nov. 21, 2005.

(51) Int. Cl.
*B01D 53/22* (2006.01)
*B01D 59/12* (2006.01)

(52) U.S. Cl. .................... 95/45; 95/47; 141/38; 141/39; 141/47; 141/49; 141/95

(58) Field of Classification Search ............ 95/45, 47; 141/38, 49, 39, 95
See application file for complete search history.

(56) References Cited

U.S. PATENT DOCUMENTS

| | | | | | |
|---|---|---|---|---|---|
| 3,540,837 | A | * | 11/1970 | Pascucci | 43/124 |
| 3,554,027 | A | * | 1/1971 | Sperberg | 73/146 |
| 5,352,272 | A | * | 10/1994 | Moll et al. | 96/9 |
| 5,431,203 | A | * | 7/1995 | Schultz et al. | 141/197 |
| 5,588,984 | A | * | 12/1996 | Verini | 95/15 |
| 5,906,227 | A | * | 5/1999 | Sowry | 141/65 |
| 6,155,313 | A | * | 12/2000 | Smalley | 141/38 |
| 6,612,346 | B1 | * | 9/2003 | Allen et al. | 141/38 |
| 7,624,774 | B2 | * | 12/2009 | Lighter | 141/237 |
| 2002/0134794 | A1 | * | 9/2002 | McManus et al. | 222/55 |

\* cited by examiner

*Primary Examiner* — Jason M Greene
*Assistant Examiner* — Anthony Shumate

(57) ABSTRACT

A method of increasing the nitrogen concentration within a tire of a vehicle includes transporting a mobile nitrogen concentrating apparatus to a position adjacent the vehicle and concentrating a nitrogen content of a compressed first gas to obtain a second gas. The method also includes coupling the nitrogen concentrating apparatus in fluid communication with the tire and programming an inflator to purge the tire to a predetermined pressure and then pressurizing the container to a predetermined pressure. The method also includes purging the container of a portion of the existing gas and introducing a portion of the second gas into the tire to create a first gas mixture. The method additionally includes purging the container of a portion of the first gas mixture, and introducing a portion of the second gas into the tire to create a second gas mixture.

9 Claims, 2 Drawing Sheets

MOBILE NITROGEN GENERATION SYSTEM

CROSS REFERENCE TO RELATED APPLICATIONS

This application claims priority to U.S. Provisional Patent Application 60/738,933 filed Nov. 21, 2005, the disclosure of which is incorporated by reference in its entirety.

TECHNICAL FIELD

The disclosure generally relates to supplying compressed nitrogen gas, and specifically to pressurizing vehicle tires with a gas that is primarily nitrogen.

BACKGROUND

Vehicle pneumatic tires typically include a rubber tire mounted on a metal rim with a valve protruding through the rim. The valve includes internal components that permit a gas to be introduced into and purged from the tire. The tire generally includes multiple layers of rubber and reinforcement with a tire liner on the inside and a tread on a generally cylindrical outer surface. Vehicle pneumatic tires are typically filled with compressed air. The air is compressed by an air compressor and stored or diverted to the tires. However, this compressed air will generally have condensed moisture from the atmosphere and may also have oils that become entrained in the compressed air within the air compressor.

Atmospheric air at sea level typically includes about 78.1% nitrogen gas ($N_2$) and about 20.9% oxygen gas ($O_2$). The remaining 1% of this air is water vapor and other gasses (hydrocarbons, argon, carbon dioxide, . . . ). As mentioned, compressing this air may result in oil entrained in the compressed air. This compressed air may also contain water droplets that condense as the air is compressed. While dryers may be added to air compressors to separate out water, some water vapor will be present in compressed air that may have been dried. This water vapor within the compressed air will be introduced into a vehicle tire when the tire is pressurized with the compressed air. However, water vapor will escape through a vehicle tire at a rate that is greater than the rate that $N_2$ will escape through the tire. Additionally, the water vapor may undesirably react with the tire, the rim, and the valve internal components to degrade these components and cause further leakage of gasses from the tire.

The $O_2$ component of the compressed air within the tire will escape through a vehicle tire at a rate that is greater than the rate that $N_2$ will escape through the tire. Furthermore, the $O_2$ component of the compressed air within the tire may damage the reinforcement and the rubber compound of the tire liner resulting in a degraded tire.

The aforementioned leakages prevent the vehicle tire from remaining at an optimum tire pressure for fuel economy, safety, and tire wear. Also, it has been found that a vehicle tire that operates with at least about 92% $N_2$ will operate at a lower temperature, thereby increasing tire life.

Compressed gasses that do not contain $O_2$ may be used to pressurize a vehicle tire, however these gasses may not be readily available for distribution or may be contained in very high pressure (greater than 2000 pounds pre square inch (psi)) containers that require special handling. Additionally, since many tires are pressurized with compressed air, purging the air and pressurizing the tire with an alternate gas may be time consuming and expensive. What is needed, therefore, is a cost effective apparatus and method for purging vehicle tires, and other components, and pressurizing the tires with gasses that do not contain undesirable amounts of $O_2$ and water.

SUMMARY

Embodiments provide an apparatus and method for purging vehicle tires, and other components, and pressurizing the tires with gasses that do not contain undesirable amounts of $O_2$ and water. Embodiments also provide a plurality of purge and pressurization cycles.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 3 is a flow chart illustrating steps of a method according to an embodiment.

DETAILED DESCRIPTION

Figure 1:
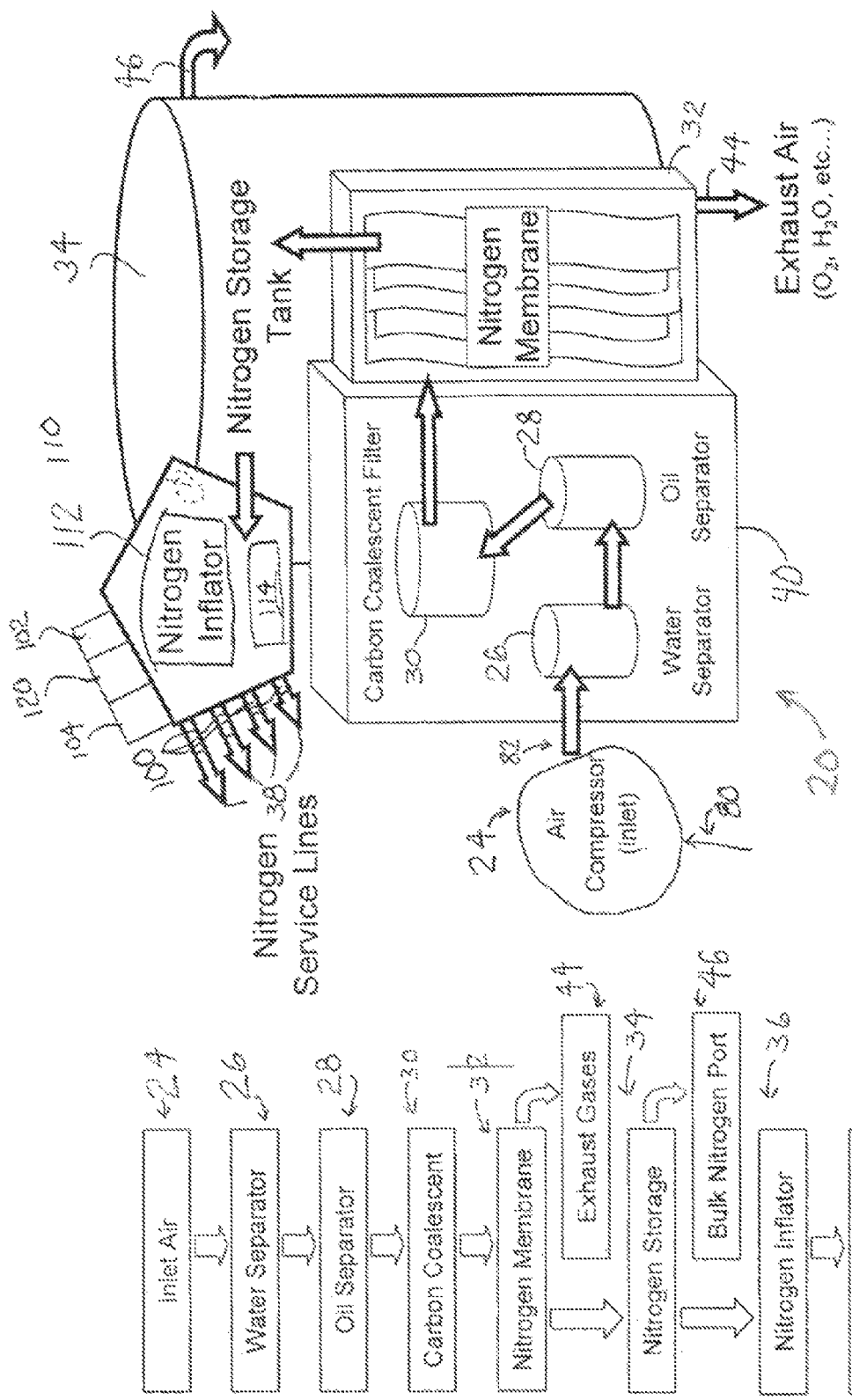
FIG. 1 is a partial perspective view of a mobile nitrogen generation system according to an embodiment.
Figure 2:
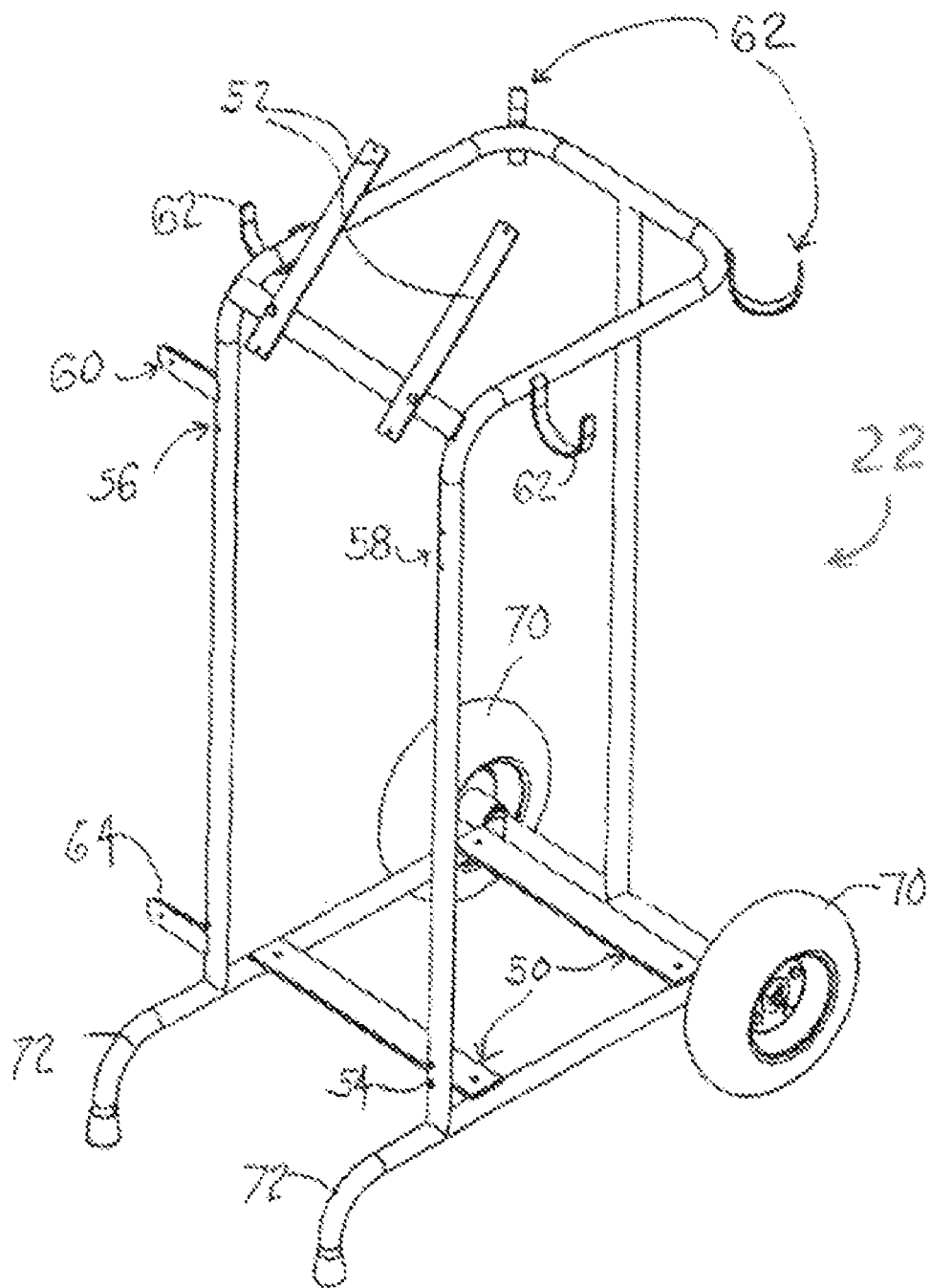
FIG. 2 is a perspective view of a mobile cart for the system of FIG. 1.

FIGS. 1 and 2 illustrate a nitrogen generation and distribution system 20. As best illustrated in FIG. 1, the system 20 includes a mobile cart 22 (FIG. 2), a compressed air supply 24, a water separator 26, an oil separator 28, a carbon filter 30, a nitrogen concentration device 32, a first storage tank 34, an inflator 36, and a plurality of service hoses 38. Collectively, the water separator 26, the oil separator 28, and the carbon filter 30 form a filtration system 40. The system 20 also includes an exhaust 44 and a bulk nitrogen connection 46.

The cart 22 includes a first storage tank mounting 50, an inflator mounting 52, a water separator mounting 54, an oil separator mounting 56, a carbon filter mounting 58, a nitrogen concentration device mounting 60, a plurality of service hose mountings 62, and a compressed air supply mounting 64. The cart 22 also includes a pair of wheels 70 and legs 72. The first storage tank 34 is mounted to the first storage tank mounting 50. The inflator 36 is mounted to the inflator mounting 52. The water separator 26 is mounted to the water separator mounting 54. The oil separator 28 is mounted to the oil separator mounting 56. The carbon filter 30 is mounted to the carbon filter mounting 58. The nitrogen concentration device 32 is mounted to the nitrogen concentration device mounting 60. The plurality of service hoses 38 may be draped over the plurality of service hose mountings 62. The compressed air supply 24 is mounted to the compressed air supply mounting 64.

The compressed air supply 24 includes a first gas inlet 80 and a compressed gas outlet 82. The compressed air supply 24 may be a second storage tank, or an air compressor. The air compressor may be operated by either electricity or fuel, and may be operated by a battery (not shown).

Operation of the system 20 to pressurize the storage tank 34 with a concentrated gas is as follows. The compressed air supply 24 diverts compressed air to the water separator 26 then through the oil separator 28 and then through the carbon filter 30. Then the filtered, compressed air is diverted to the nitrogen concentration device 32 and then to the first storage tank 34. As the air flows through the nitrogen concentration device 32, a portion of the air is diverted to the exhaust 44, and a portion of the air is diverted to the first storage tank 34. The bulk nitrogen connection 46 may be used to extract nitrogen from or inject nitrogen into, the storage tank 34.

The inflator 36 includes a plurality of inflator control valves 100, a $N_2$ concentration sensor 102, and a flow sensor 104. The inflator 36 may also include a microprocessor 110, a display 112, and a keypad 114. The microprocessor 110 is for programming the inflator to conduct a purge and pressurization cycle, as discussed in greater detail below. A service hose pressure sensor 120 may be in fluid communication with the service hose 38 to detect the pressure (static or dynamic) within the service hose 38. The inflator 36 may also include an audible notification device 124, as discussed in greater detail below.

As will be appreciated, the plurality of service hoses 38 may be connected to the inflator 36 in parallel, as illustrated in FIG. 1, or may be connected in series with a single hose 38 connected to the inflator 36 and including a plurality of tee connections for tire valves to enable the inflator 36 to be in fluid communication with multiple tires of a vehicle simultaneously.

As best illustrated in at least one of FIGS. 1-3, the system 20 may be operated to concentrate the $N_2$ component of the compressed air as follows. The system 20 is transported to a position adjacent a vehicle (not shown). The service hoses 38 are then connected to the tire valves and the inflator is started to purge and pressurize the tires. The inflator 36 is then started to initiate a purge and pressurization cycle. In this example, the existing gas within the tires, at the pressure of the tires, is vented through a control valve 100.

The inflator 36 may be 'manually' operated, where a user stops a purge and/or pressurization step within a cycle, or the inflator 36 may be operated 'automatically' where the microprocessor 110 detects the pressure within the service hoses 38 to determine when to purge, when to pressurize, and when to notify a user that the desired cycles are complete.

In the embodiment illustrated, the purge and pressurize cycles may also be referred to as deflate/inflate cycles. A plurality of purge and pressurization cycles, may include a plurality of differing desired purge pressures and pressurization pressures. In a first example, a tire pressurized with air at about 40 psig may be purged to a purge pressure of about 3 psig, then pressurized to a pressurization pressure of about 40 psig, then purged to a purge pressure of about 3 psig, and then pressurized to a pressurization pressure of about 40 psig. In a second example, a tire pressurized with air at about 40 psig may be purged to a purge pressure of about 3 psig, then pressurized to a pressurization pressure of about 40 psig, then purged to a purge pressure of about 20 psig, then pressurized to a pressurization pressure of about 40 psig, then purged to a purge pressure of about 20 psig, and then pressurized to a pressurization pressure of about 40 psig. The resulting $N_2$ concentration using the first exemplary purge and pressurization cycle has been found to be about the same as the resulting $N_2$ concentration using the second exemplary purge and pressurization cycle. In operation, the second exemplary purge and pressurization cycle has been found to decrease the required time to obtain a desired concentration of $N_2$ within a vehicle tire when compared to the first exemplary purge and pressurization cycle.

The flow sensors 104 may be reversible flow sensors in fluid communication with each service hose 38 to detect the volumetric flow rate of gas flowing through the service hoses 38. The flow sensor 104 may be operably connected to the inflator 36 such that the inflator microprocessor 110 can detect the flow rate of gas through the flow sensor. Thus attached, the microprocessor, and/or the user, may detect the pressure drop in a tire and the corresponding flow rate of gas being purged from the tire. This change in pressure and flow rate may then be used to estimate the total tire volume and/or estimate a time remaining to complete a single purge and pressurization cycle, or a plurality of purge and pressurization cycles, regardless of the desired purge pressures and pressurization pressures.

A venturi may be used to purge the tires, or other gas containers as follows. As is known, a flow of gas through a venturi may develop a vacuum just downstream of the venturi. In operation, the compressed air supply 24 is connected to the venturi to force compressed air at about 60-120 pounds per square inch gauge (psig) through a venturi body, creating a vacuum of about 1-3 pounds per square inch absolute (psia) downstream of the venturi where a service hose 38 is connected to the venturi body. Using this configuration, a vehicle tire, or a plurality of vehicle tires, may be purged from about 40 psig to about 3 psig in a greater amount of time than the tires could be purged with no vacuum assist. Using the venturi with the first exemplary purge and pressurization cycle may decrease the required time to obtain a desired concentration of $N_2$ within a vehicle tire.

In another example of operation, the service hoses 38 are connected to four tires of a vehicle and the tire valves are opened such that at least a portion of the inflator 36 is in fluid communication with the tires. The inflator 36 may then purge a small amount of gas from each tire, divert the gas to the $N_2$ concentration sensor 102 and display the $N_2$ concentration of each tire to a user. The user and/or the microprocessor 110 may then determine whether to purge and pressurize each tire, and the number of purge and pressurization cycles required to obtain a desired $N_2$ concentration in each tire. The user and/or the microprocessor 110 may make this determination based upon a look-up table or by performing calculations. The microprocessor 110 may then automatically perform purge and pressurize cycles, or may await an input from the user to perform cycles.

In the embodiment illustrated, there are four nitrogen service hoses 38, although five service hoses 38 may be provided to pressurize a spare tire. The nitrogen storage tank 34 may be omitted from the system 20 and the gasses concentrated within the nitrogen concentration device 32 may be diverted directly to the inflator 36. Additionally, the system 20 may not include the flow sensors 104, check valves, and 102.

In the embodiment illustrated, the nitrogen concentration device 32 includes a nitrogen separation membrane (not shown). When a first gas, such as air, with a determinable concentration of nitrogen, oxygen, and other gasses is passed over the nitrogen separation membrane, the membrane preferably permits at least a portion of the oxygen and other gasses that have a smaller molecular structure than $N_2$ to permeate therethrough while permitting only a small portion of the $N_2$ to permeate therethrough. The nitrogen concentration device 32 may include an inlet check valve and an outlet check valve to prevent gasses from flowing through the nitrogen concentration device 32 in an undesired direction.

Also, the nitrogen concentration device 32 may use chemical separation of gasses to obtain a gas with a desired level of $N_2$, or a chemical (catalyst) may be added to the nitrogen separation membrane to increase efficiency. In one embodiment, a nitrogen separation membrane that has an increased efficiency with greater temperatures (above about 40 F) is used and a coating on a portion of the nitrogen concentration device 32 reacts with the flow of gas to increase the temperature of the gas, thereby increasing the efficiency of the nitrogen concentration device 32.

In another embodiment, re-concentration of the concentrated gas may be performed to generate a gas with a higher percentage of $N_2$ than the concentrated gas. For re concentration, valving within system 20 may be changed to divert gas from the storage tank 34 through the nitrogen concentration device 32 and to the inflator 36. This re-concentrated gas may have a $N_2$ concentration of greater than about 97% $N_2$ (although 99% may be achievable), when the $N_2$ concentration of the storage tank 34 is greater than about 92% $N_2$. Additionally, re-concentration may be performed when the efficiency of the nitrogen concentration device 32 is below a desired level and the $N_2$ concentration produced in a single concentration process through the nitrogen concentration device 32 does not produce a gas with a minimum desired $N_2$ concentration.

The filtration system 40 may separate undesired gasses and solid and liquid particulate. These undesired gasses include hydrocarbons and other gasses that have a relatively large molecular structure compared to $N_2$. During operation of the nitrogen concentration device 32, hydrocarbons will not permeate through the membrane and, therefore, will be diverted to the storage tank 34. These 'heavy' gasses may then be forced into a vehicle tire.

These undesired gasses that are separated by the filtration system 40 also include water vapor and oils. One reason for separating undesired gasses from the flow is to prevent these gasses from entering a vehicle tire. Another reason for separating undesired gasses from the flow is to prevent these gasses from interacting with the nitrogen concentration device 32, as these undesired gasses may damage and/or reduce the efficiency of the nitrogen concentration device 32.

Although the steps of the method of making the device 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of increasing the nitrogen concentration within a tire of a vehicle comprising:
   transporting a mobile nitrogen concentrating apparatus to a position adjacent the vehicle;
   concentrating a nitrogen content of a compressed first gas to obtain a second gas;
   coupling the nitrogen concentrating apparatus in fluid communication with the tire, wherein the tire includes an existing gas contained therein;
   programming an inflator to purge the tire to a first predetermined pressure and then pressurize the tire to a second predetermined pressure;
   purging the tire of a portion of the existing gas to the first predetermined pressure; then
   introducing a portion of the second gas into the tire to create a first mixture, wherein the first mixture has a higher nitrogen concentration than the existing gas; then
   purging the tire of a portion of the first mixture; then
   introducing a portion of the second gas into the tire to create a second mixture, wherein the second mixture has a higher nitrogen concentration than the first mixture;
   detecting a change in pressure within the tire;
   detecting a flow rate of air related to the tire;
   estimating a total tire volume using the detected change in pressure and the detected flow rate;
   estimating a time remaining for completing a plurality of purge and pressurize cycles as a function of detected change in pressure and the detected flow rate; and
   notifying a user of the estimated remaining time.

2. The method of claim 1, wherein concentrating a nitrogen content of a compressed first gas includes permeating at least a portion of the compressed first gas through a separation membrane.

3. The method of claim 1, wherein purging the tire of a portion of the existing gas includes creating a vacuum on a portion of a tire valve.

4. The method of claim 1, further comprising storing the second gas in a storage tank coupled to the cart.

5. The method of claim 1, further comprising filtering the first gas through a filter system prior to concentrating the first gas.

6. The method of claim 5, wherein filtering the first gas through the filter system includes removing hydrocarbons from the first gas.

7. The method of claim 1, further comprising simultaneously pressurizing a plurality of tires with the second gas.

8. The method of claim 1, further comprising determining the nitrogen concentration within the tire.

9. The method of claim 1, further comprising notifying a user that desired cycles of purging and introducing are complete.

* * * * *